(12) United States Patent
Jin et al.

(10) Patent No.: US 12,026,483 B2
(45) Date of Patent: Jul. 2, 2024

(54) PROGRAMMING MARKING METHOD, PROCESSOR, TERMINAL, AND COMPUTER PROGRAM PRODUCT

(71) Applicant: Siemens Ltd., China, Beijing (CN)

(72) Inventors: Xin Jin, Beijing (CN); Liang Liao, Beijing (CN); Jun Yi Shan, Yingkou (CN)

(73) Assignee: SIEMENS LTD., CHINA, Beijing (CN)

( * ) Notice: Subject to any disclaimer, the term of this patent is extended or adjusted under 35 U.S.C. 154(b) by 0 days.

(21) Appl. No.: 18/005,441

(22) PCT Filed: Jul. 14, 2020

(86) PCT No.: PCT/CN2020/101946
§ 371 (c)(1),
(2) Date: Jan. 13, 2023

(87) PCT Pub. No.: WO2022/011562
PCT Pub. Date: Jan. 20, 2022

(65) Prior Publication Data
US 2023/0297343 A1 Sep. 21, 2023

(51) Int. Cl.
*G05B 19/00* (2006.01)
*G06F 8/34* (2018.01)
(52) U.S. Cl.
CPC ....................................... *G06F 8/34* (2013.01)
(58) Field of Classification Search
CPC .............................. G06F 8/34; G05B 19/056
See application file for complete search history.

(56) References Cited

U.S. PATENT DOCUMENTS

| 5,966,532 A | 10/1999 | Mcdonald et al. ........... 717/105 |
| 2009/0100407 A1* | 4/2009 | Bouillet .................... G06F 8/34 |
| | | 717/105 |

(Continued)

FOREIGN PATENT DOCUMENTS

| CN | 102 999 322 | 3/2013 | ............... G06F 9/44 |
| CN | 108 459 853 | 8/2018 | ............... G06F 8/30 |

(Continued)

OTHER PUBLICATIONS

NPL1 (Simulink, 2015) (Year: 2015).*

(Continued)

*Primary Examiner* — Hang Pan
*Assistant Examiner* — Noor Alkhateeb
(74) *Attorney, Agent, or Firm* — Slayden Grubert Beard PLLC

(57) ABSTRACT

The present disclosure describes programming marking methods. Various examples include: displaying device controls for at least two operating devices associated with a target task to be executed, where the display configures programming logic of the device controls for the operating devices; determining a respective device group to which each of the operating devices belongs; configuring a group tag for the operating device used for marking the device group; and displaying on a second interface a programming flowchart used when the operating devices execute the target task. The programming flowchart includes at least two function blocks. Each of the function blocks is controlled by one operating device to perform one processing action. Each of the function blocks is marked with a group tag matching the operating device. The second interface configures the function blocks and the execution logic between the function blocks.

10 Claims, 9 Drawing Sheets

(56) References Cited

U.S. PATENT DOCUMENTS

| | | | |
|---|---|---|---|
| 2010/0280633 A1 | 11/2010 | Taschke | 700/81 |
| 2011/0040390 A1 | 2/2011 | Blevins et al. | 700/18 |
| 2015/0095882 A1* | 4/2015 | Jaeger | G06F 8/34 |
| | | | 717/109 |
| 2015/0277406 A1* | 10/2015 | Maturana | G06F 9/451 |
| | | | 700/83 |
| 2019/0103763 A1* | 4/2019 | Colclazier | H02J 3/04 |
| 2021/0056433 A1* | 2/2021 | Chen | G06F 8/34 |

FOREIGN PATENT DOCUMENTS

| | | | | |
|---|---|---|---|---|
| CN | 108 621 151 | 10/2018 | | B25J 9/16 |
| CN | 110 497 412 | 11/2019 | | B25J 9/16 |
| CN | 111 190 589 | 5/2020 | | G06F 8/34 |

OTHER PUBLICATIONS

Search Report for International Application No. PCT/CN2020/101946, 13 pages, dated Apr. 16, 2021.
Extended European Search Report, Application No. 20944853.9, 13 pages, Feb. 7, 2024.

\* cited by examiner

PROGRAMMING MARKING METHOD, PROCESSOR, TERMINAL, AND COMPUTER PROGRAM PRODUCT

CROSS-REFERENCE TO RELATED APPLICATIONS

This application is a U.S. National Stage Application of International Application No. PCT/CN2020/101946 filed Jul. 14, 2020, which designates the United States of America, the contents of which are hereby incorporated by reference in their entirety.

TECHNICAL FIELD

The present disclosure relates to electronic control. Various embodiments include programming marking methods, processors, terminals, and/or computer program products.

BACKGROUND

For many automatic production line programming tools, different corresponding programming function modules are often respectively configured, on a programming interface, for different operations to be performed by different operating device. For example, one operating system requires three to five or more operating devices to control robotic arms respectively connected to the operating devices to perform different production operations, then process information formed by the programming function modules corresponding to the operations of the operating devices respectively is presented on the programming interface.

In other words, currently, the programming function modules presented in a programming file provided in the related art can only reflect sequence information of a process in which the operating devices execute a task but cannot distinguish different operations performed by different operating devices.

SUMMARY

Teachings of the present disclosure include various embodiments including programming marking methods, processors, terminals, and computer program products, to resolve the problem of relatively complex programming processing operations in the prior art. For example, some embodiments include a programming marking method, comprising: displaying, on a first interface, device controls for at least two operating devices associated with a target task to be executed, wherein the first interface is configured to configure programming logic of the device controls for the operating devices; determining a respective device group to which each of the at least two operating devices belongs; configuring a group tag for the operating device, wherein the group tag is used for marking the device group to which the operating device belongs; and displaying, on a second interface associated with the first interface, a programming flowchart used when the at least two operating devices execute the target task, wherein the programming flowchart comprises at least two function blocks, each of the at least two function blocks is controlled by one operating device to perform one processing action, each of the function blocks is marked with a group tag matching with the operating device, wherein the second interface is configured to configure the function blocks and the execution logic between the function blocks.

In some embodiments, the configuring a group tag for the operating device comprises: accepting a first editing operation performed on the device control for each of the operating devices; and acquiring, in response to the first editing operation, the group tag configured for the operating device.

In some embodiments, accepting a first editing operation performed on the device control for each of the operating devices comprises: accepting a first trigger action performed on the device control for the operating device; and displaying a candidate group tag list on the first interface in response to the first trigger action, wherein each candidate group tag in the candidate group tag list comprises a tag identifier and tag description information; and acquiring the group tag configured for the operating device comprises: accepting a second trigger action in the candidate group tag list; and determining, in response to the second trigger action, the group tag configured for the operating device.

In some embodiments, the method further comprises: accepting a first editing operation performed on the device control for each of the operating devices comprises: accepting a third trigger action performed on the device control for the operating device; and displaying a tag configuration interface on the first interface in response to the third trigger action, wherein the tag configuration interface comprises device information of the operating device and a tag configuration control, the tag configuration control is configured to acquire a candidate group tag list, and each candidate group tag in the candidate group tag list comprises a tag identifier and tag description information; and acquiring the group tag configured for the operating device comprises: accepting a fourth trigger action in the candidate group tag list; and determining, in response to the fourth trigger action, the group tag configured for the operating device.

In some embodiments, after the acquiring the group tag configured for the operating device, the method further comprises: accepting a second editing operation performed on the configured group tag; and modifying a tag identifier of the group tag from an original identifier to a customized identifier in response to the second editing operation.

In some embodiments, the configuring a group tag for the operating device comprises: acquiring task description information of the target task, wherein the task description information is used for describing device information of the operating devices required for executing the target task; and automatically configuring the group tag for the operating device according to the task description information.

In some embodiments, the automatically configuring the group tag for the operating device according to the task description information comprises sequentially configuring, according to a preset priority, candidate group tags in a candidate group tag list to the operating devices used during execution of the target task.

In some embodiments, after the displaying a programming flowchart used when the at least two operating devices execute the target task, the method further comprises: accepting a third editing operation performed on a first function block in the programming flowchart, wherein a first group tag is configured for the first function block; displaying a tag option list in response to the third editing operation, wherein the tag option list comprises a group tag of an operating device of the same operation type as a first operating device controlling the first function block in different device groups used during execution of the target task; and replacing the first group tag of the first function block with a second group tag.

In some embodiments, after the replacing the first group tag of the first function block with a second group tag, the method further comprises: determining a second function block associated with the first function block in the target task, wherein the second function block and the first function block use the same operating device to perform the same processing action, and the same first group tag is configured for the second function block and the first function block; and replacing the first group tag of the second function block with the second group tag.

In some embodiments, the accepting a third editing operation performed on a first function block in the programming flowchart comprises: displaying, in response to detecting that an action trigger control is on an icon of the first group tag of the first function block, tag detail information matching the first group tag; and acquiring a fifth trigger action performed on a selection control embedded in the tag detail information, wherein the fifth trigger action is used for triggering display of the tag option list.

In some embodiments, after the displaying a programming flowchart used when the at least two operating devices execute the target task, the method further comprises displaying, in response to detecting that the action trigger control is on an icon of a group tag of any function block, tag detail information matching the group tag.

As another example, some embodiments include a processor configured to run a program, wherein the program, when run, performs one or more of the methods described herein.

As another example, some embodiments include a terminal, comprising one or more processors, a memory, and one or more programs, wherein the one or more programs are stored in the memory and configured to be executed by the one or more processors, and the one or more programs comprise instructions for performing one or more of the methods.

As another example, some embodiments include a computer program product tangibly stored on a computer-readable medium and comprising computer-executable instructions, the computer-executable instructions, when executed, causing at least one processor to perform one or more of the methods described herein.

BRIEF DESCRIPTION OF THE DRAWINGS

The accompanying drawings of the specification constituting a part of this application are intended to provide further understanding of the teachings of the present disclosure. Exemplary embodiments and the description thereof are used for explanation and do not constitute any inappropriate limitation to scope of the present disclosure. In the accompanying drawings.

Figure 1:
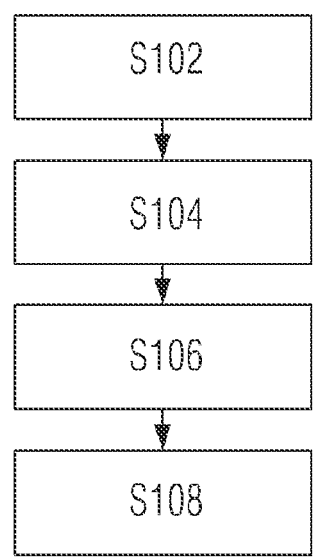
FIG. 1 is a flowchart of an optional programming marking method incorporating teachings of the present disclosure.

The accompanying drawings include the following reference numerals:

S102: Display, on a first interface, device controls for at least two operating devices associated with a target task to be executed, where the first interface is configured to configure programming logic of the device controls for the at least two operating devices.

S104: Determine a respective device group to which each of the at least two operating devices belongs.

S106: Configure a group tag for the operating device, where the group tag is used for marking the device group to which the operating device belongs.

S108: Display, on a second interface associated with the first interface, a programming flowchart used when the at least two operating devices execute the target task, where the programming flowchart includes at least two function blocks, each of the at least two function blocks is controlled by one operating device to perform one processing action, each of the at least two function blocks is marked with a group tag matching the operating device, and the second interface is configured to configure the function blocks and the execution logic between the function blocks S202: Trigger and start a task in the programming flowchart.

S204: Perform a processing action in FB-1.
S206: Perform a processing action in FB-2.
S208: Perform a processing action in FB-3.
S210: Perform a processing action in FB-4.
S212: Perform a processing action in FB-5.
S214: Perform a processing action in FB-6.
S216: Complete the task.
30: Operating device
31: Rectangular region
32: List
40: Operating device
41: Tag indication region
32-2: Slash-filled tag identifier
50: Tag configuration interface
51: Region
52: Menu list selection control
53: Candidate group tag list
54: Region
S502: Display a candidate group tag list 53 after a click trigger action for triggering a pull-down list in the menu list selection control 52 is acquired.
S504: Acquire a selection trigger action in the candidate group tag list 53, and determine that a group tag indicated by a third tag identifier is selected to be a group tag currently assigned to the operating device 30.

S506: Display a configuration result of the foregoing selection in the head (region 54 shown in FIG. 5) of the menu list selection control 52.

60: Input box

61: Candidate group tag

S602: Acquire an editing operation in an input box 60 in the region 54.

S604: Adjust an identifier displayed by a candidate group tag 61 in the candidate group tag list.

S606: Adjust a tag display region corresponding to a group tag of an FB in the programming flowchart to the customized "R1".

S608: Expand and display tag detail information matching the group tag "R1".

70: Operating device

71: Tag indication region

72: Operating device

73: Tag indication region

S802: Display a tag option list

S804: Switch and display the group tag of the first function block as "R1-UR5" in the programming flowchart.

S902: Expand and display tag detail information of the group tag.

S1002: Expand and display tag detail information of the group tag when it is detected that a cursor hovers over and is displayed on an icon of a group tag of any function block (the function block FB-k shown in the figure) in the programming flowchart.

S1004: Display the tag detail information as "B-AGV".

110: Operating device

111: Operating device

112: Operating device

113: Operating device

114: Operating device

115: Operating device

DETAILED DESCRIPTION

Some embodiments of the present disclosure include a programming marking method including: displaying, on a first interface, device controls for at least two operating devices associated with a target task to be executed, where the first interface is configured to configure programming logic of the device controls for the at least two operating devices; determining a respective device group to which each of the at least two operating devices belongs; configuring a group tag for the operating device, where the group tag is used for marking the device group to which the operating device belongs; and displaying, on a second interface associated with the first interface, a programming flowchart used when the at least two operating devices execute the target task, where the programming flowchart includes at least two function blocks, each of the at least two function blocks is controlled by one operating device to perform one processing action, each of the at least two function blocks is marked with a group tag matching the operating device, and the second interface is configured to configure the function blocks and the execution logic between the function blocks.

In this way, after the device group to which the operating device controlling each function block to perform a processing action belongs is determined, the corresponding group tag is configured for the operating device, and the group tag is marked and displayed on each function block in the programming flowchart, to intuitively identify the device group to which the operating device associated with each function block belongs, thereby simply and intuitively showing, in a graphical programming process, a correspondence between the device group to which the operating device belongs and the processing action to be performed by the function block. No additional search operation needs to be performed to determine the operating device or device group that performs the processing action in the current function block, thereby simplifying display operations, and then overcoming the problem of relatively high complexity of programming operations in the related art. In addition, displaying group tags on a graphical programming interface further enriches the display content in the programming flowchart, which helps to assist novice engineers in completing the application programming process more easily.

In some embodiments, configuring a group tag for the operating device includes: accepting a first editing operation performed on the device control for each of the operating devices; and acquiring, in response to the first editing operation, the group tag configured for the operating device. In this way, after the first editing operation performed on the device control for the operating device is accepted, the group tag configured for the operating device is acquired, so that during display of the programming flowchart, the group tag is marked and displayed in a function block controlled by the operating device, to intuitively distinguish different device groups.

In some embodiments, accepting a first editing operation performed on the device control for each of the operating devices includes: accepting a first trigger action performed on the device control for the operating device; and displaying a candidate group tag list on the first interface in response to the first trigger action, where each candidate group tag in the candidate group tag list includes a tag identifier and tag description information; and the acquiring the group tag configured for the operating device includes: accepting a second trigger action in the candidate group tag list; and determining, in response to the second trigger action, the group tag configured for the operating device. In this way, after the first trigger action performed on the device control for the operating device is accepted, the candidate group tag list is displayed on the first interface. Subsequently, the second trigger action is accepted in the candidate group tag list, to determine the group tag configured for the operating device. In other words, by directly triggering display of the candidate group tag list matching the operating device, a user is prompted to determine a group tag configured for the current operating device from the candidate group tag list, thereby helping to assist novice engineers in quickly configuring group tags for the operating devices, and improving the programming efficiency.

In some embodiments, accepting a first editing operation performed on the device control for each of the operating devices includes: accepting a third trigger action performed on the device control for the operating device; and displaying a tag configuration interface on the first interface in response to the third trigger action, where the tag configuration interface includes device information of the operating device and a tag configuration control, the tag configuration control is configured to acquire a candidate group tag list, and each candidate group tag in the candidate group tag list includes a tag identifier and tag description information; and the acquiring the group tag configured for the operating device includes: accepting a fourth trigger action in the candidate group tag list; and determining, in response to the fourth trigger action, the group tag configured for the operating device. In this way, after the third trigger action performed on the device control for the operating device is accepted, the tag configuration interface of the operating device is displayed on the first interface, so that the fourth trigger action is accepted in the candidate group tag list displayed on the tag configuration interface, and subsequently the group tag configured for the operating device is determined in response to the fourth trigger action. In other words, the user is prompted through a guiding interface to perform a corresponding action, to select the group tag configured for the current operating device from the candidate group tag list, thereby helping to assist novice engineers in quickly configuring group tags for the operating devices, and improving the programming efficiency.

In some embodiments, after acquiring the group tag configured for the operating device, the method further includes accepting a second editing operation performed on the configured group tag; and modifying a tag identifier of the group tag from an original identifier to a customized identifier in response to the second editing operation. In this way, after the second editing operation performed on the configured group tag is accepted, the tag identifier of the group tag can be modified from the original identifier to the customized identifier. Therefore, an effect of flexibly adjusting a name identifier of the group tag according to a user requirement is realized, thereby facilitating the user in memorizing and understanding, and further facilitating the subsequent quick programming processing, to improve the programming efficiency.

In some embodiments, configuring a group tag for the operating device includes: acquiring task description information of the target task, where the task description information is used for describing device information of the operating devices required for executing the target task; and automatically configuring the group tag for the operating device according to the task description information. In this way, after the task description information of the target task is acquired, the corresponding group tags are automatically configured, according to the task description information, for the plurality of operating devices executing the target task, and manual operations by the user are no longer required, to simplify the configuration operations and improve the group tag configuration efficiency.

In some embodiments, automatically configuring the group tag for the operating device according to the task description information includes: sequentially configuring, according to a preset priority, candidate group tags in a candidate group tag list to the operating devices used during execution of the target task. In this way, the candidate group tags in the candidate group tag list can be sequentially configured, according to the preset priority, to the operating devices used during execution of the target task, and manual operations by the user are no longer required, to simplify the configuration operations and improve the group tag configuration efficiency.

In some embodiments, after displaying a programming flowchart used when the at least two operating devices execute the target task, the method further includes: accepting a third editing operation performed on a first function block in the programming flowchart, where a first group tag is configured for the first function block; displaying a tag option list in response to the third editing operation, where the tag option list includes a group tag of an operating device of the same operation type as a first operating device controlling the first function block in different device groups used during execution of the target task; and replacing the first group tag of the first function block with a second group tag. In this way, after the third editing operation performed on the first function block in the programming flowchart for which the first group tag is configured is accepted, the tag option list is displayed, where the tag option list includes a group tag of an operating device of the same operation type as the first operating device controlling the first function block in different device groups used during execution of the target task. Subsequently, after the second group tag is determined from the tag option list, the first group tag of the first function block is replaced with the second group tag, so as to quickly modify and replace group tags of function blocks in the programming flowchart instead of writing programming code for modification and replacement separately, to simplify the operations of modifying and replacing the group tags, and further improve the programming effect.

In some embodiments, after replacing the first group tag of the first function block with a second group tag, the method further includes: determining a second function block associated with the first function block in the target task, where the second function block and the first function block use the same operating device to perform the same processing action, and the same first group tag is configured for the second function block and the first function block; and replacing the first group tag of the second function block with the second group tag. In this way, after a plurality of function blocks (for example, the first function block and the second function block) in the programming flowchart that use the same operating device to perform the same processing action and for which same group tags are configured, the plurality of group tags can be modified and replaced in batches in the foregoing manner without manual modification and replacement one by one, thereby synchronously modifying group tags of a plurality of or all function blocks for which same group tags are configured and that perform the same processing action through one operation of modifying and replacing the group tags, and then improving the efficiency of modifying and replacing the group tags.

In some embodiments, accepting a third editing operation performed on a first function block in the programming flowchart includes: displaying, in response to detecting that an action trigger control is on an icon of the first group tag of the first function block, tag detail information matching the first group tag; and acquiring a fifth trigger action performed on a selection control embedded in the tag detail information, where the fifth trigger action is used for triggering display of the tag option list. In this way, in a case that it is detected that the action trigger control is on the icon of the first group tag of the first function block, tag detail information matching the first group tag is displayed; and then a trigger action performed on the selection control embedded in the tag detail information is acquired, to trigger display of the tag option list. Therefore, display of the tag option list in the programming flowchart is triggered through a simple combination of trigger actions without additional programming code or programming operations, thereby further ensuring the efficiency of modifying and replacing the group tags.

In some embodiments, after displaying a programming flowchart used when the at least two operating devices execute the target task, the method further includes: displaying, in response to detecting that the action trigger control is on an icon of a group tag of any function block, tag detail information matching the group tag. In this way, in a case that it is detected that the action trigger control is on an icon of a group tag of any function block, tag detail information matching the group tag is displayed. Therefore, when there is no display requirement, the tag detail information is hidden to save display space. When there is a display requirement, the tag detail information is expanded and displayed, which enriches the display content of the group tags and enables the user to know more tag information.

In some embodiments, a processor is configured to run a program, and the program, when run, performs one or more of the methods described herein.

In some embodiments, a terminal includes: one or more processors, a memory, and one or more programs, where the one or more programs are stored in the memory and configured to be executed by the one or more processors, and the one or more programs include instructions for performing one or more of the methods described herein.

In some embodiments, a computer program product is stored on a tangible computer-readable medium and includes computer-executable instructions, the computer-executable instructions, when executed, causing at least one processor to perform one or more of the methods described herein.

In some embodiments, after a device group to which an operating device controlling each function block to perform a processing action belongs is determined, a corresponding group tag is configured for the operating device, and the group tag is marked and displayed on each function block in a programming flowchart, to intuitively identify the device group to which the operating device associated with each function block belongs, thereby simply and intuitively showing, in a graphical programming process, a correspondence between the device group to which the operating device belongs and the processing action to be performed by the function block. No additional search operation needs to be performed to determine the operating device or device group that performs the processing action in the current function block, thereby simplifying display operations, and then overcoming the problem of relatively high complexity of programming operations in the related art. In addition, displaying group tags on a graphical programming interface further enriches the display content in the programming flowchart, which helps to assist novice engineers in completing the application programming process more easily.

It should be noted that the embodiments described in this disclosure and the features in the embodiments may be combined with each other in case of no conflicts. It should be noted that, unless otherwise specified, all technical and scientific terms used herein have the same meaning as commonly understood by a person of ordinary skill in the art to which this application belongs.

In the present disclosure, unless otherwise specified, orientation terms such as "up, down, top, and bottom" are generally used based on a direction shown in the accompanying drawings, or generally defined based on components in a vertical, perpendicular, or gravity direction; and similarly, for ease of understanding and description, "inside and outside" refer to inside and outside relative to a profile of each component. However, the foregoing orientation terms are not intended to limit scope of the present disclosure.

In some embodiments, a programming marking method may include, but is not limited to, the following steps shown in FIG. 1:

S102: Display, on a first interface, device controls for at least two operating devices associated with a target task to be executed, where the first interface is configured to configure programming logic of the device controls for the at least two operating devices.

S104: Determine a respective device group to which each of the at least two operating devices belongs.

S106: Configure a group tag for the operating device, where the group tag is used for marking the device group to which the operating device belongs.

S108: Display, on a second interface associated with the first interface, a programming flowchart used when the at least two operating devices execute the target task, where the programming flowchart includes at least two function blocks, each of the at least two function blocks is controlled by one operating device to perform one processing action, each of the at least two function blocks is marked with a group tag matching the operating device, and the second interface is configured to configure the function blocks and the execution logic between the function blocks.

In some embodiments, the programming marking method may be applied to, but not limited to, a computer programming tool, programming logic of the device controls for the at least two operating devices required in the target task to be executed and configuring the function blocks and the execution logic between the function blocks through a man-machine interaction interface provided in the computer programming tool. For example, the foregoing programming logic and execution logic relationship are presented in the form of a programming flowchart. The interaction interface may be, but not limited to, a channel for information exchange between a man and a computer. The user enters information to the computer and perform operations through the interaction interface, and the computer provides information to the user through the interaction interface for reading, analysis, and determining. The device control for each operating device and each function block (FB) in this embodiment will be presented on the man-machine interaction interface in a graphical form, so as to directly complete the application programming process of the target task through configuration operations on the man-machine interaction interface.

Each function block herein integrates a set of program instructions in application programming, and the set of program instructions is that one operating device performs one processing action.

Figure 2:
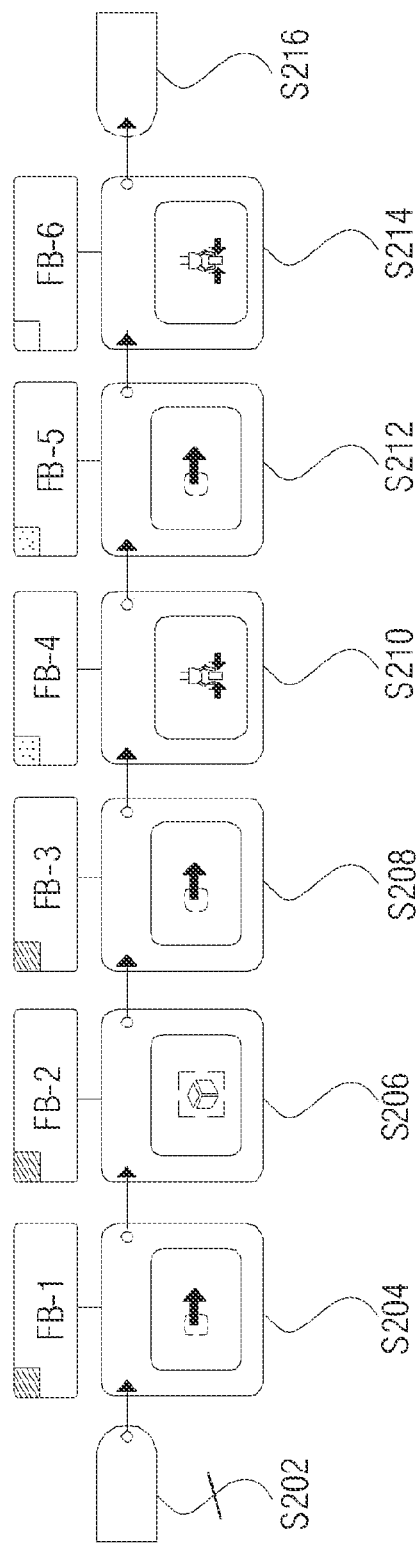
FIG. 2 is a flowchart of a programming flowchart in an optional programming marking method incorporating teachings of the present disclosure.

For example, the programming flowchart shown in FIG. 2 includes at least six function blocks, which are sequentially: an FB-1 for moving an object to a shooting position, an FB-2 for acquiring a sorting position of the object, an FB-3 for moving to the shooting position, an FB-4 for grasping the object, an FB-5 for moving the object to the box position to be released, and an FB-6 for releasing the object. Each FB includes a set of program instructions in application programming required by one operating device to control and perform one processing action in the target task. For example, the FB-1 to the FB-3 with slashed box marks are controlled by an operating device A, the FB-4 and the FB-5 with dot box marks are controlled by an operating device B, the FB-6 with a blank box mark is controlled by an operating device C. Subsequently, the corresponding actions in the foregoing programming flowchart are sequentially performed. For example, in S202, a task in the programming flowchart is triggered and started; in S204 to S214, processing actions in the foregoing FB-1 to FB-6 are sequentially performed; and finally, in S216, the task is completed. The foregoing descriptions are examples. This is not limited in this embodiment.

In some embodiments, after the device controls for the at least two operating devices associated with the target task to be executed are displayed on the first interface, the respective device group to which each of the at least two operating devices belongs is determined. Subsequently, a group tag used for marking the device group to which the operating device belongs is configured for the operating device, and a programming flowchart used when the at least two operating devices execute the target task is displayed on a second interface associated with the first interface, where the programming flowchart includes at least two function blocks, each of the at least two function blocks is controlled by one operating device to perform one processing action, and each of the at least two function blocks is marked with a group tag matching the operating device.

Herein, the first interface is configured to configure programming logic of the device controls for the operating devices and the second interface is configured to configure the function blocks and the execution logic between the function blocks. In some embodiments, after a device group to which an operating device controlling each function block to perform a processing action belongs is determined, a corresponding group tag is configured for the operating device, and the group tag is marked and displayed on each function block in a programming flowchart, to intuitively identify the device group to which the operating device associated with each function block belongs, thereby simply and intuitively showing, in a graphical programming process, a correspondence between the device group to which the operating device belongs and the processing action to be performed by the function block. No additional search operation needs to be performed to determine the operating device or device group that performs the processing action in the current function block, thereby simplifying display operations, and then overcoming the problem of relatively high complexity of programming operations in the related art. In addition, displaying group tags on a graphical programming interface further enriches the display content in the programming flowchart, which helps to assist novice engineers in completing the application programming process more easily.

In some embodiments, the manner of configuring a group tag for the operating device may include, but not limited to the following: a first editing operation performed on a device control for an operating device displayed on the interface is accepted; and a group tag configured for the operating device is acquired in response to the first editing operation. For the function blocks controlled by operating devices belonging to different device groups in the programming flowchart, the group tags may be used, but not limited to, for distinguishing and marking function blocks controlled by operating devices belonging to different device groups by using group tags formed by different graphics, colors, or text, and combinations thereof. In addition, in this embodiment, the first editing operation may include, but not limited to, an action combination formed by different trigger actions, for example, an action combination of at least two click actions (such as continuous right mouse clicks or continuous left mouse clicks or a combination of a left mouse click and a right mouse click), an action combination of a click action and a sliding action, an action combination of a click action and a gesture, or an action combination of a gesture and a sliding action. In other words, the first editing operation is implemented through the foregoing different trigger actions, so as to complete the configuration operation of configuring the group tag for the operating device.

In some embodiments, after task description information of the target task is acquired, a group tag is automatically configured for an operating device according to the task description information. For example, in a case that the task description information indicates that the execution of the target task requires three operating devices: the operating device A, the operating device B, and the operating device C, corresponding group tags may be sequentially configured for the operating devices in a default arrangement order (or a preset priority) from a preconfigured candidate group tag list. For example, it is assumed that the default sorting order (or preset priority) is red, yellow, and blue, then group tags of corresponding colors may be sequentially assigned to the operating device A, the operating device B, and the operating device C. It should be noted that the task description information in this embodiment is used for describing device information of the operating devices required during execution of the target task, such as a device quantity, a device type, a device function, a device importance level, and a device execution order.

In some embodiments, the process of configuring the group tag for the operating device may further include, but not limited to, accepting a second editing operation performed on the configured group tag; and modifying a tag identifier of the group tag from an original identifier to a customized identifier in response to the second editing operation. In other words, the tag identifier of the group tag may be selected as the default original identifier, or may be customized through edition as an identifier that is easy for the user to memorize and understand. For example, as shown in FIG. 2, the default original identifier may be a blank box mark, which may be adjusted to a slashed box mark or a dot box mark through a customized editing process. The descriptions herein are examples, and the presentation style and content of the group tag are not limited in this embodiment.

In some embodiments, after the programming flowchart is displayed, the method may further include, but not limited to, accepting a third editing operation performed on a first function block in the programming flowchart for which a first group tag is configured: displaying a tag option list in response to the third editing operation, where the tag option list includes a group tag of an operating device of the same operation type as a first operating device controlling the first function block in different device groups used during execution of the target task. Subsequently, a second group tag is acquired from the tag option list, and the first group tag of the first function block is replaced with a second group tag. Therefore, rapid same-type replacement on group tags related to the first function block in all programming flowcharts is implemented without manually modifying the configuration according to a guiding interface. Especially, for example, in a case that the first function block is applied in different programming flowcharts, or is applied in a programming flowchart for a plurality of times, one replacement can be implemented in the foregoing manner, which simplifies operations of modifying and replacing the group tags, and improving the modification efficiency.

After a device group to which an operating device controlling each function block to perform a processing action belongs is determined, a corresponding group tag is configured for the operating device, and the group tag is marked and displayed on each function block in a programming flowchart, to intuitively identify the device group to which the operating device associated with each function block belongs, thereby simply and intuitively showing, in a graphical programming process, a correspondence between the device group to which the operating device belongs and the processing action to be performed by the function block. No additional search operation needs to be performed to determine the operating device or device group that performs the processing action in the current function block, thereby simplifying display operations, and then overcoming the problem of relatively high complexity of programming operations in the related art. In addition, displaying group tags on a graphical programming interface further enriches the display content in the programming flowchart, which helps to assist novice engineers in completing the application programming process more easily.

In some embodiments, the configuring a group tag for the operating device includes: S1: accepting a first editing operation performed on the device control for each of the operating devices; and S2: acquiring, in response to the first editing operation, the group tag configured for the operating device.

In some embodiments, the first editing operation may be, but not limited to, a configuration editing operation performed on each operating device, for example, clicking a device control for an operating device to cause the operating device to enter an editing state, and then acquiring a group tag of the operating device in the editing state. For example, a group tag selected by the user is acquired, or a group tag automatically assigned by a system is acquired. The group tags may be, but not limited to, identifier tags used for distinguishing and marking different device groups. For example, for different device groups, different color tags (such as red, yellow, and blue) may be used for distinguishing, different graphic tags (such as a square, a circle, and a triangle) may alternatively be used for distinguishing, and different filling pattern tags (such as dot filling, slash filling, and blank) may alternatively be used for distinguishing. The foregoing descriptions are examples. The style and content of the group tag are not limited in this embodiment.

Figure 3:
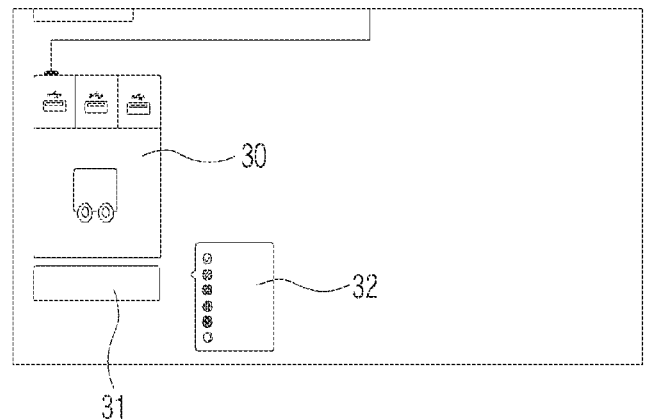
FIG. 3 is a schematic diagram of an optional programming marking method incorporating teachings of the present disclosure.

Specifically, a description is provided with reference to the example shown in FIG. 3: it is assumed that the operating device currently accepting the first editing operation is an operating device 30 shown in FIG. 3, and a group tag indication region of the operating device 30 is a rectangular region 31 shown in FIG. 3. Further, a group tag configured for the operating device 30 is selected from a tag list 32 for providing candidate group tags shown in FIG. 3, and the selected group tag is displayed in the rectangular region 31.

By using the embodiments provided in this application, after the first editing operation performed on the device control for the operating device is accepted, the group tag configured for the operating device is acquired, so that during display of the programming flowchart, the group tag is marked and displayed in a function block controlled by the operating device, to intuitively distinguish different device groups.

In some embodiments, accepting a first editing operation performed on the device control for each of the operating devices includes: accepting a first trigger action performed on the device control for the operating device; and displaying a candidate group tag list on the first interface in response to the first trigger action, where each candidate group tag in the candidate group tag list includes a tag identifier and tag description information; and acquiring the group tag configured for the operating device includes: accepting a second trigger action in the candidate group tag list; and determining, in response to the second trigger action, the group tag configured for the operating device.

In some embodiments, the first trigger action may be, but not limited to, a click trigger action performed on a device control for the selected operating device to display a candidate group tag list for selection, so as to select a group tag configured for the operating device from the candidate group tag list. Each candidate group tag includes a tag identifier and tag description information. For example, the candidate group tag list may be the list 32 shown in FIG. 3. The tag identifier in each candidate group tag may be a circular identifier with a different filling pattern shown in FIG. 3, and corresponding tag description information may further be displayed next to each tag identifier (not shown in the figure). The second circular identifier in the list 32 (that is, the circular identifier filled with slashes) is used as an example. The tag description information herein is used for describing the tag identifier. For example, the corresponding tag description information may be "slash" or "Line".

Figure 4:
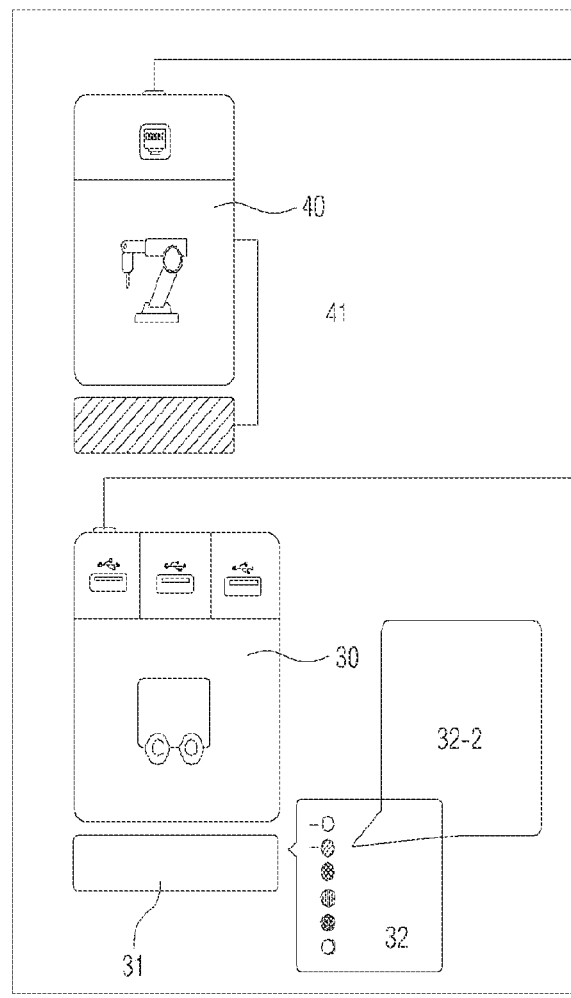
FIG. 4 is a schematic diagram of another optional programming marking method incorporating teachings of the present disclosure.

Specifically, a description is provided with reference to the example shown in FIG. 4: it is assumed that the operating device 30 shown at the bottom of FIG. 4 accepts a click trigger action for configuring a group tag. A candidate group tag list is displayed in response to the click trigger action, which may be, for example, the list 32 in FIG. 4, where tag identifiers with different filling patterns are displayed therein, the blank is a default tag identifier, and the list further includes tag identifiers such as slash filling, grid filling, and dot filling. Further, it is assumed that a device group to which the operating device 30 belongs is G1, and a group tag of the device group G1 may be correspondingly displayed as the slash-filled tag identifier 32-2 shown in the figure, then a click selection action performed on the slash-filled tag identifier 32-2 is acquired, and a group tag corresponding to the slash-filled tag identifier 32-2 is configured for the operating device 30, and is displayed in the tag indication region 31 corresponding to the operating device 30.

In addition, for a display result after the group tag is configured, reference may be made to a configuration result of an operating device 40 shown at the top of FIG. 4. It is assumed that the device group to which the operating device 40 belongs is also the device group G1, which is also correspondingly displayed as the slash-filled tag identifier 32-2 shown in the figure, then the configuration result may be displayed as displaying a slash-filled tag in the tag indication region 41 corresponding to the operating device 40.

By using the embodiments provided in this application, after the first trigger action performed on the device control for the operating device is accepted, the candidate group tag list is displayed on the first interface. Subsequently, the second trigger action is accepted in the candidate group tag list, to determine the group tag configured for the operating device. In other words, by directly triggering display of the candidate group tag list matching the operating device, a user is prompted to determine a group tag configured for the current operating device from the candidate group tag list, thereby helping to assist novice engineers in quickly configuring group tags for the operating devices, and improving the programming efficiency.

In some embodiments, accepting a first editing operation performed on the device control for each of the operating devices includes: accepting a third trigger action performed on the device control for the operating device; and displaying a tag configuration interface on the first interface in response to the third trigger action, where the tag configuration interface includes device information of the operating device and a tag configuration control, the tag configuration control is configured to acquire a candidate group tag list, and each candidate group tag in the candidate group tag list includes a tag identifier and tag description information; and acquiring the group tag configured for the operating device includes: accepting a fourth trigger action in the candidate group tag list; and determining, in response to the fourth trigger action, the group tag configured for the operating device.

In some embodiments, the tag configuration interface may correspond to, but not limited to, the selected operating device to be configured, and the tag configuration interface may include device information of the operating device to be configured, and a tag configuration control configured to configure a group tag for the operating device. The tag configuration control may carry, but not limited to, a menu list selection control for the user to select, and the menu list provided herein is used for displaying the candidate group tag list.

Figure 5:
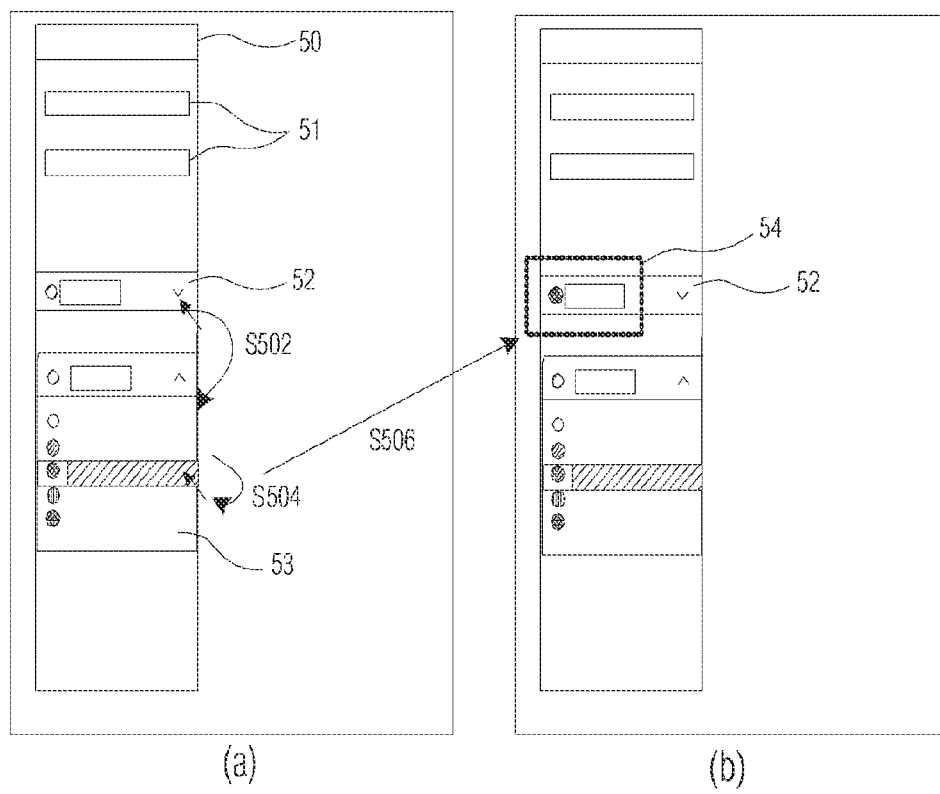
FIG. 5 is a schematic diagram of still another optional programming marking method incorporating teachings of the present disclosure.

Specifically, a description is provided with reference to the content shown in FIG. 5 (a) and FIG. 5(b): it is assumed that a description is provided by still using an example in which the operating device 30 accepts a click trigger action for configuring a group tag. In response to the click trigger action, a tag configuration interface corresponding to the operating device 30 is displayed, as shown in the left column in FIG. 5(a), where device information of the operating device 30 may be displayed in a region 51 of the tag configuration interface 50. The device information herein may include, but not limited to: a device type identifier of the operating device 30 and a storage IP address of the device control for the operating device 30. The tag configuration control of the operating device 30 may be, for example, a menu list selection control 52 shown in FIG. 5(a).

Step S502: Display a candidate group tag list 53 shown in FIG. 5(a) after a click trigger action for triggering a pull-down list in the menu list selection control 52 is acquired.
Step S504: Acquire a selection trigger action in the candidate group tag list 53, and determine that a group tag indicated by a third tag identifier (grid filling) is selected to be a group tag currently assigned to the operating device 30.
Step S506: Display a configuration result of the foregoing selection in a head region 54 (as shown in the slashed box in FIG. 5(b)) of the menu list selection control 52.

By using the embodiments provided in this application, after the third trigger action performed on the device control for the operating device is accepted, the tag configuration interface of the operating device is displayed on the first interface, so that the fourth trigger action is accepted in the candidate group tag list displayed on the tag configuration interface, and subsequently the group tag configured for the operating device is determined in response to the fourth trigger action. In other words, the user is prompted through a guiding interface to perform a corresponding action, to select the group tag configured for the current operating device from the candidate group tag list, thereby helping to assist novice engineers in quickly configuring group tags for the operating devices, and improving the programming efficiency.

In some embodiments, after acquiring the group tag configured for the operating device, the method further includes: accepting a second editing operation performed on the configured group tag; and modifying a tag identifier of the group tag from an original identifier to a customized identifier in response to the second editing operation.

Figure 6:
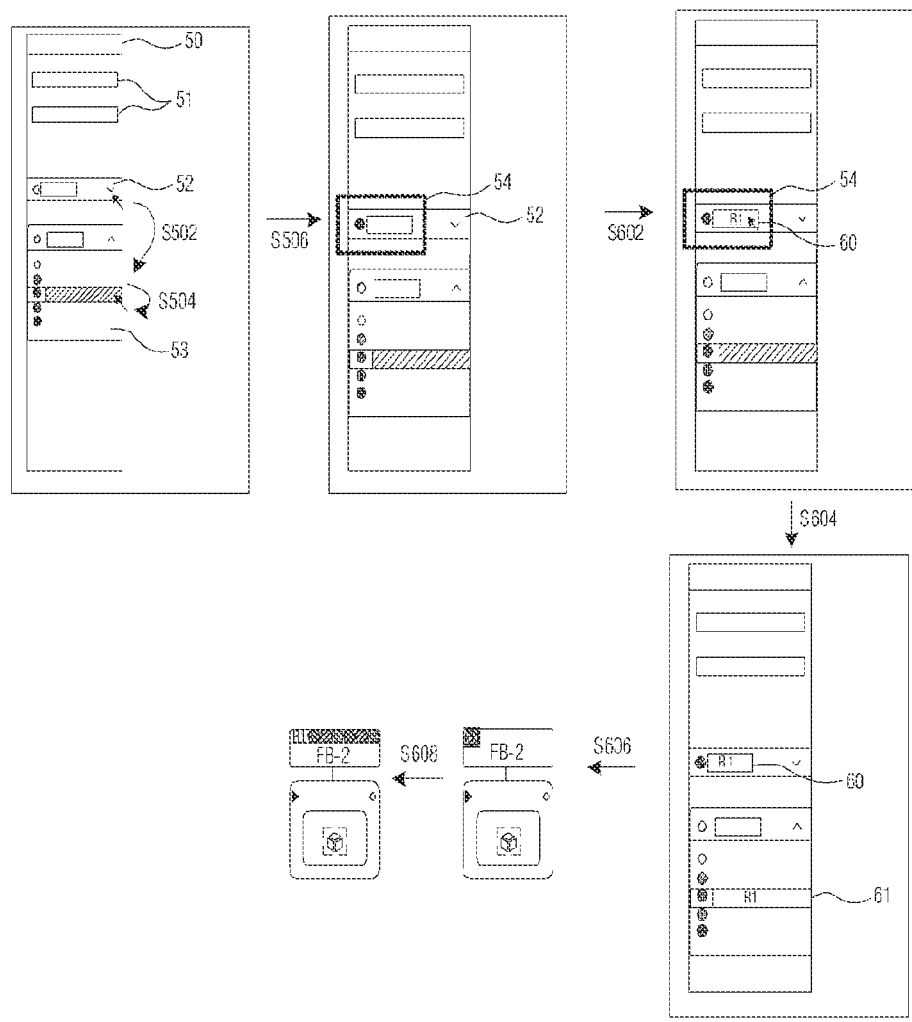
FIG. 6 is a schematic diagram of still another optional programming marking method incorporating teachings of the present disclosure.

Specifically, a description is provided with reference to the example shown in FIG. 6: it is assumed that the subsequent operations continue to be performed based on the configuration process shown in FIG. 5. StepS5602: Acquire an editing operation in an input box 60 in the region 54, where, for example, the editing operation is customizing an identifier name of the group tag for the operating device 30, for example, customizing and modifying the identifier name to "R1" as shown in the figure. Step S604: Correspondingly adjust an identifier displayed by a candidate group tag 61 in the candidate group tag list, that is, adjust the name of the third tag identifier (grid filling) to customized "R1".

Step S606: Adjust a tag display region (for example, the upper left corner in the figure) corresponding to a group tag of an FB (assumed to be the FB-2) in the programming flowchart to the foregoing customized "R1". When it is detected that a cursor hovers over and is displayed on the group tag "R1" of the FB-2, then as in step S608, tag detail information matching the group tag "R1" is expanded and displayed.

By using the embodiments provided in this application, after the second editing operation performed on the configured group tag is accepted, the tag identifier of the group tag can be modified from the original identifier to the customized identifier. Therefore, an effect of flexibly adjusting a name identifier of the group tag according to a user requirement is realized, thereby facilitating the user in memorizing and understanding, and further facilitating the subsequent quick programming processing, to improve the programming efficiency.

In some embodiments, configuring a group tag for the operating device includes: acquiring task description information of the target task, where the task description information is used for describing device information of the operating devices required for executing the target task; and automatically configuring the group tag for the operating device according to the task description information.

In some embodiments, the task description information may include, but not limited to, device information of the operating devices required for execution of the target task, such as a device quantity, a device type, a device function, a device importance level, and a device execution order. After the task description information is analyzed, a corresponding group tag may be automatically configured for the corresponding operating device directly according to the analysis result.

For example, it is assumed that after the task description information of the target task is acquired, it is determined according to the task description information that three operating devices including the operating device A, the operating device B, and the operating device C are required to execute the target task, and the execution order of the three operating devices is: operating device C→operating device B→operating device A. In addition, it is assumed that the default sorting order in the candidate group tag list is: slash-filled tag→grid-filled tag→blank tag. Therefore, slash-filled tags, grid-filled tags, and blank tags are sequentially configured for the operating device A, the operating device B, and the operating device C as their corresponding group tags.

In some embodiments, a default group tags may be configured for an operating device. The default group tag herein may be, but not limited to, the first group tag in the candidate group tag list, for example, a blank tag.

Figure 7:
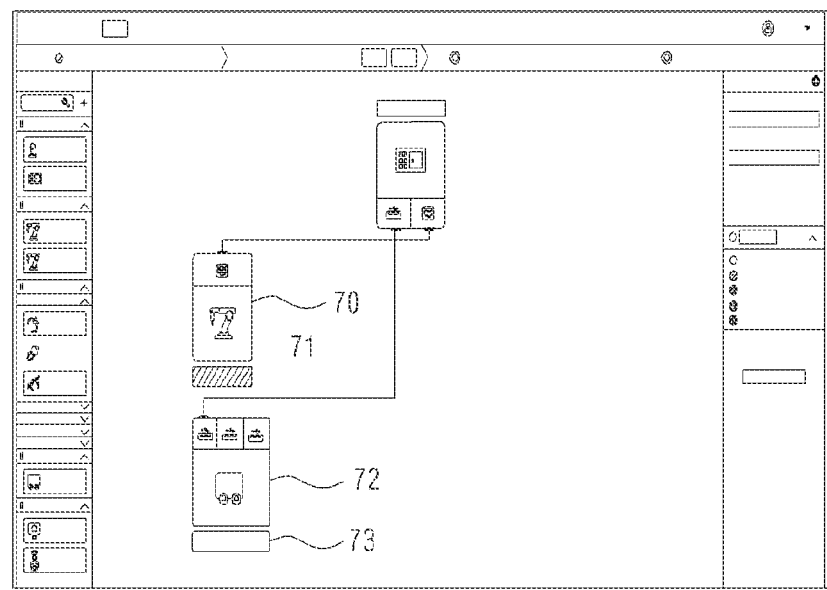
FIG. 7 is a schematic diagram of still another optional programming marking method incorporating teachings of the present disclosure.

For example, as shown in FIG. 7, it is assumed that an operating device 70 and an operating device 72 are required to execute the target task, then group tags of device groups to which the operating device 70 and the operating device 72 belong may be configured for the operating device 70 and the operating device 72 respectively. As shown in the figure, a slash-filled tag configured for the operating device 70 is displayed in a tag indication region 71 corresponding to the operating device 70, and a default original tag, for example, a blank tag, configured for the operating device 72 is displayed in a tag indication region 73 corresponding to the operating device 72.

By using the embodiments provided in this application, after the task description information of the target task is acquired, the corresponding group tags are automatically configured, according to the task description information, for the plurality of operating devices executing the target task, and manual operations by the user are no longer required, to simplify the configuration operations and improve the group tag configuration efficiency.

In some embodiments, automatically configuring the group tag for the operating device according to the task description information includes sequentially configuring, according to a preset priority, candidate group tags in a candidate group tag list to the operating devices used during execution of the target task.

In some embodiments, the plurality of candidate group tags in the candidate group tag list may be preconfigured, but not limited to, with an arrangement order, where the arrangement order herein may be, but not limited to, a preset priority order. For example, it is assumed that the candidate group tags are color tags, then the color tags may be sequentially: red, orange, yellow, green, cyan, blue, purple, and so on according to a priority in descending order.

For example, it is assumed that after the task description information of the target task is acquired, it is determined according to the task description information that three operating devices including the operating device A, the operating device B, and the operating device C are required to execute the target task, and the execution order of the three operating devices is: operating device C→operating device B→operating device A. In addition, it is assumed that the default sorting order in the candidate group tag list is: red→yellow→blue. Therefore, red, yellow, and blue are sequentially configured for the operating device A, the operating device B, and the operating device C as their corresponding group tags.

By using the embodiments provided in this application, the candidate group tags in the candidate group tag list can be sequentially configured, according to the preset priority, to the operating devices used during execution of the target task, and manual operations by the user are no longer required, to simplify the configuration operations and improve the group tag configuration efficiency.

In some embodiments, after displaying a programming flowchart used when the at least two operating devices execute the target task, the method further includes accepting a third editing operation performed on a first function block in the programming flowchart, where a first group tag is configured for the first function block; displaying a tag option list in response to the third editing operation, where the tag option list includes a group tag of an operating device of the same operation type as a first operating device controlling the first function block in different device groups used during execution of the target task; and determining a second group tag from the tag option list; replacing the first group tag of the first function block with a second group tag.

Figure 8:
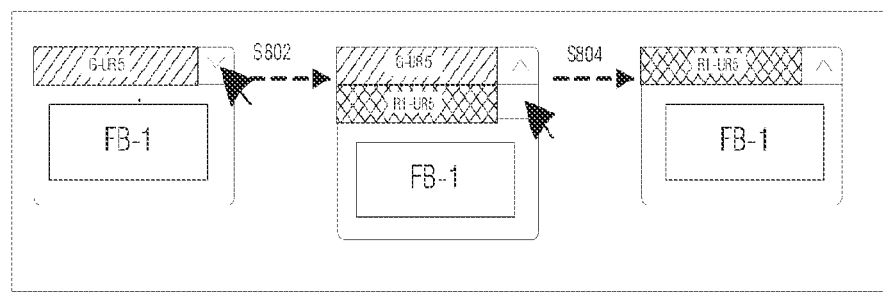
FIG. 8 is a schematic diagram of still another optional programming marking method incorporating teachings of the present disclosure.

Specifically, a description is provided with reference to the example shown in FIG. 8: it is assumed that different device groups used during execution of the target task include a device group G1 and a device group G2, where the first operating device that controls the first function block belongs to the device group G1, and the device type of the first operating device is UR-5.

Further, in a case that a third editing operation for modifying the group tag of the first function block (the FB-1 shown in the figure) is acquired, as in step S802, a tag option list is displayed. The content shown in FIG. 8 will be displayed in the tag option list: the group tag of the device type UR-5 in the device group G1, for example, "G-UR5", and the group tag of the device type UR-5 in the device group G2, for example, "R1-UR5". In a case that it is determined from the tag option list that the group tag "G-UR5" of the first function block is modified to the group tag "R1-UR5", as in step S804, the group tag of the first function block is switched and displayed as "R1-UR5" in the programming flowchart.

By using the embodiments provided in this application, after the third editing operation performed on the first function block in the programming flowchart for which the first group tag is configured is accepted, the tag option list is displayed, where the tag option list includes a group tag of an operating device of the same operation type as the first operating device controlling the first function block in different device groups used during execution of the target task. Subsequently, after the second group tag is determined from the tag option list, the first group tag of the first function block is replaced with the second group tag, so as to quickly modify and replace group tags of function blocks in the programming flowchart instead of writing programming code for modification and replacement separately, to simplify the operations of modifying and replacing the group tags, and further improve the programming effect.

In some embodiments, after replacing the first group tag of the first function block with a second group tag, the method further includes: determining a second function block associated with the first function block in the target task, where the second function block and the first function block use the same operating device to perform the same processing action, and the same first group tag is configured for the second function block and the first function block; and replacing the first group tag of the second function block with the second group tag.

In some embodiments, a group tag modification operation synchronized with the first function block may alternatively be performed on a second function block that uses the same operating device as the first function block to perform the same processing action and for which the same first group tag is configured.

By using the embodiments provided in this application, after a plurality of function blocks (for example, the first function block and the second function block) in the programming flowchart that use the same operating device to perform the same processing action and for which same group tags are configured, the plurality of group tags can be modified and replaced in batches in the foregoing manner without manual modification and replacement one by one, thereby synchronously modifying group tags of a plurality of or all function blocks for which same group tags are configured and that perform the same processing action through one operation of modifying and replacing the group tags, and then improving the efficiency of modifying and replacing the group tags.

In some embodiments, accepting a third editing operation performed on a first function block in the programming flowchart includes: displaying, in response to detecting that an action trigger control is on an icon of the first group tag of the first function block, tag detail information matching the first group tag; and acquiring a fifth trigger action performed on a selection control embedded in the tag detail information, where the fifth trigger action is used for triggering display of the tag option list.

In some embodiments, the action trigger control may be, but not limited to, a trigger control configured to replace a user to perform an action in a computer device, for example a cursor. When it is detected that a cursor hovers over and is displayed on an icon of the first group tag of the first function block, tag detail information matching the first group tag is expanded and displayed.

Figure 9:
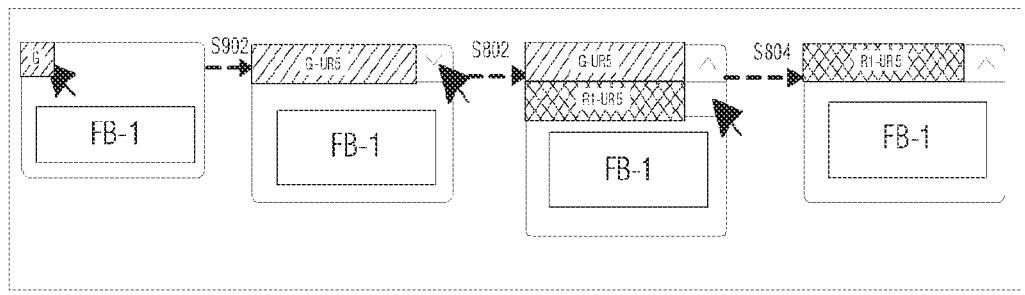
FIG. 9 is a schematic diagram of still another optional programming marking method incorporating teachings of the present disclosure.

Specifically, description is provided with reference to the example shown in FIG. 9. The description continues by still using an example in which a third editing operation for modifying the group tag of the first function block (the function block FB-1 shown in the figure) is acquired. When it is detected that the cursor hovers over and is displayed on the icon "G" of the group tag of the first function block (the function block FB-1 shown in the figure), as in step S902, the tag detail information of the group tag is expanded and displayed. It is assumed that the detail information includes the device type "UR5" of the operating device used by the first function block, then the corresponding tag detail information is displayed as "G-UR5". Further, after a click action performed on the pull-down list in the selection control embedded in the tag detail information (click a button next to the tag detail information "G-UR5" shown in the figure) is acquired, step S802 is performed, to display the tag option list. The following content will be displayed in the tag option list: the group tag of the device type UR-5 in the device group G1, for example, "G-UR5", and the group tag of the device type UR-5 in the device group G2, for example, "R1-UR5".

By using the embodiments provided in this application, in a case that it is detected that the action trigger control is on the icon of the first group tag of the first function block, tag detail information matching the first group tag is displayed; and then a trigger action performed on the selection control embedded in the tag detail information is acquired, to trigger display of the tag option list. Therefore, display of the tag option list in the programming flowchart is triggered through a simple combination of trigger actions without additional programming code or programming operations, thereby further ensuring the efficiency of modifying and replacing the group tags.

In some embodiments, after displaying a programming flowchart used when the at least two operating devices execute the target task, the method further includes displaying, in response to detecting that the action trigger control is on an icon of a group tag of any function block, tag detail information matching the group tag.

Figure 10:
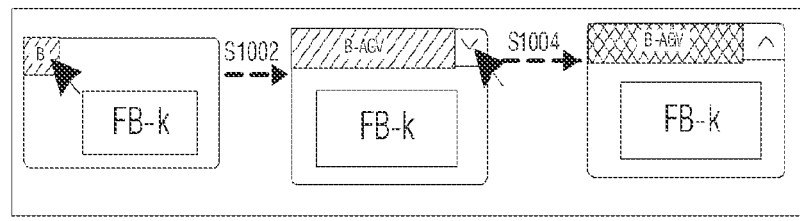
FIG. 10 is a schematic diagram of still another optional programming marking method incorporating teachings of the present disclosure.

Specifically, a description is provided with reference to the example shown in FIG. 10. Step S1002: Expand and display tag detail information of the group tag when it is detected that a cursor hovers over and is displayed on an icon of a group tag of any function block (the function block FB-k shown in the figure) in the programming flowchart (assuming that the icon of the group tag of the function block FB-k shows "B"). It is assumed that the detail information includes the device type "AGV" of the operating device used by the function block FB-k, then in step S1004, the tag detail information is correspondingly displayed as "B-AGV".

By using the embodiments provided in this application, in a case that it is detected that the action trigger control is on an icon of a group tag of any function block, tag detail information matching the group tag is displayed. Therefore, when there is no display requirement, the tag detail information is hidden to save display space. When there is a display requirement, the tag detail information is expanded and displayed, which enriches the display content of the group tags and enables the user to know more tag information.

Figure 11:
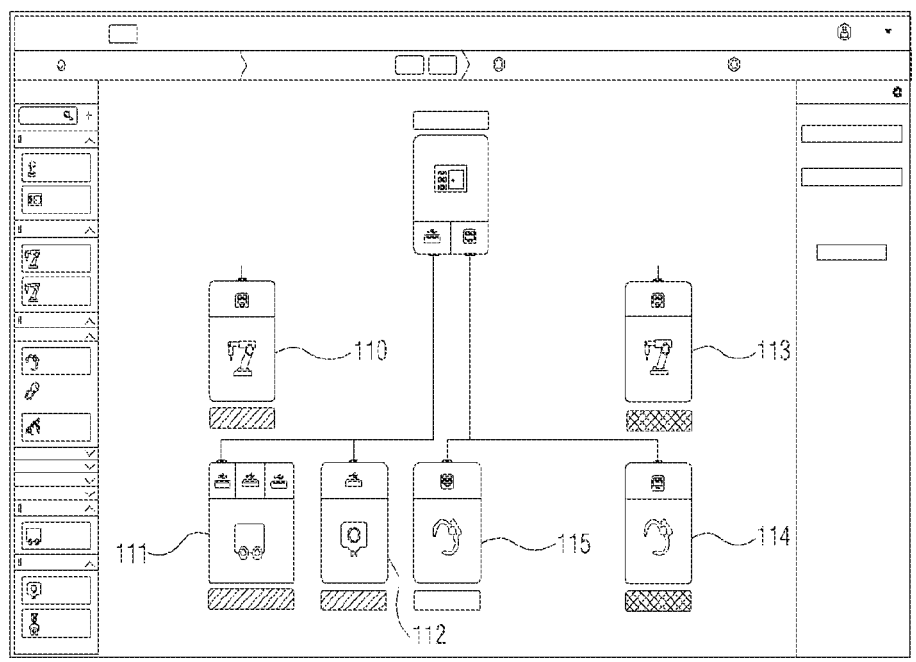
FIG. 11 is a schematic diagram of an example of a first interface in an optional programming marking method incorporating teachings of the present disclosure.
Figure 12:
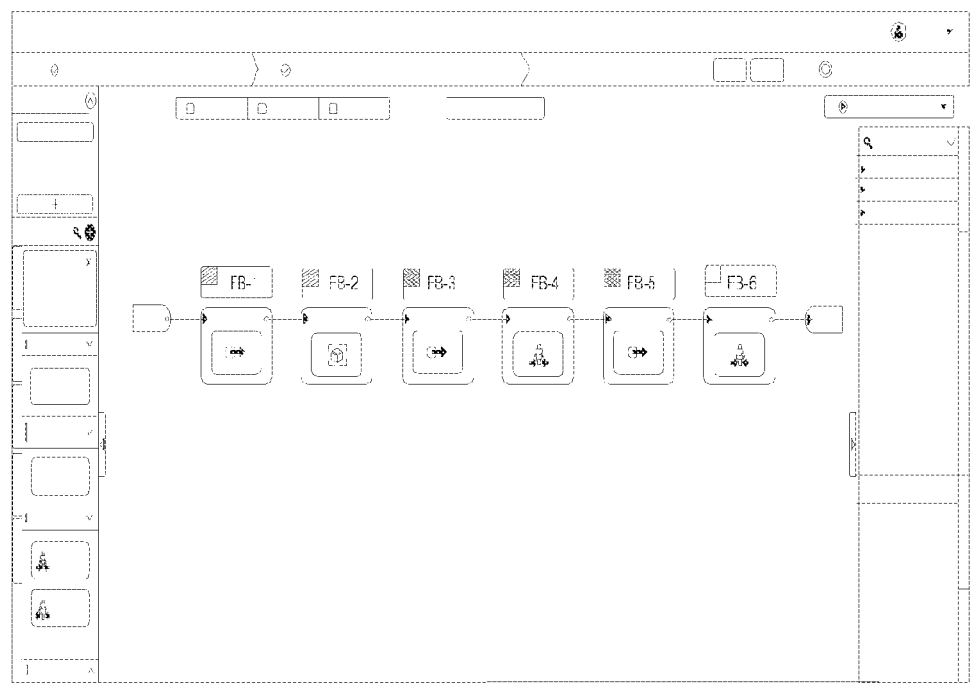
FIG. 12 is a schematic diagram of an example of a second interface in another optional programming marking method incorporating teachings of the present disclosure.

Specifically, the foregoing programming marking method is described with reference to the content shown in FIG. 11 and FIG. 12. It is assumed that device controls for the operating devices associated with execution of the target task are displayed on the first interface shown in FIG. 11. In this example, six operating devices are required to execute the target task, which are respectively an operating device 110 to an operating device 115. Each operating device controls one function block to perform one action, for example, the operating device 110 controls the function block FB-1, the operating device 111 controls the function block FB-2, the operating device 112 controls the function block FB-3, and the operating device 113 controls the function block FB-4, the operating device 114 controls the function block FB-5, and the operating device 115 controls the function block FB-6.

In addition, the operating device 110 to the operating device 112 all belong to the device group G1, both the operating device 113 and the operating device 114 belong to the device group G2, and the operating device 115 belongs to the device group G3. Further, it is assumed that the group tag configured for the device group G1 is a slash-filled tag, the group tag configured for the device group G2 is a grid-filled tag, and the group tag configured for the device group G3 is a blank tag. Therefore, the programming flowchart corresponding to the target task may be displayed on the second interface shown in FIG. 12, a slash-filled tag may be marked and displayed on the upper left corner of the function block FB-1 to the function block FB-3, a grid-filled tag may be marked and displayed on the upper left corner of the function block FB-4 and function block FB-5, and a blank tag may be marked and displayed on the upper left corner of the function block FB-6.

It is to be noted that, for ease of description, the foregoing method embodiments are represented as a series of action combinations, but a person skilled in the art should know that the teachings of the present disclosure is not limited to the described order of the actions because some steps may be performed in another order or performed simultaneously. In addition, a person skilled in the art should also appreciate that all the embodiments described in the specification are exemplary embodiments, and the related actions and modules are not mandatory.

In some embodiments, a memory may be configured to store a software program and module, such as a program instruction/module corresponding to the programming marking methods described herein. The processor executes various functional applications and performs data processing by running the software program and module stored in the memory, thereby implementing the foregoing programming marking method. The memory may include a high-speed random access memory, and may also include a non-volatile memory, for example, one or more magnetic storage apparatuses, flash memories, or other nonvolatile solid-state memories. In some embodiments, the memory may further include memories remotely disposed relative to the processor, and these remote memories may be connected to the terminal through a network. The foregoing examples of the network include, but not limited to, the Internet, an intranet, a local area network, a mobile communication network, and a combination thereof.

A person of ordinary skill in the art may understand that the terminal herein may be a terminal device such as a smartphone (for example, an Android mobile phone and an iOS mobile phone), a tablet computer, a palmtop computer, a mobile Internet device (MID), and a PAD. In some embodiments, the terminal may be a node in a distributed system. The distributed system may be a blockchain system. The blockchain system may be a distributed system formed by the plurality of nodes connected in the form of network communication. A peer to peer (P2P) network may be formed between the nodes. A computing device in any form, for example, an electronic device such as a server or a terminal, may become a node in the blockchain system by joining the P2P network. The sequence numbers of the embodiments described herein are merely for the description purpose but do not imply a preference among the embodiments.

In a case that the integrated unit in the foregoing embodiments is implemented in the form of a software functional unit and sold or used as an independent product, the integrated unit may be stored in the foregoing computer-readable storage medium. Based on such an understanding, the technical solutions essentially, or the part contributing to the prior art, or all or some of the technical solutions may be embodied in the form of a software product. The computer software product is stored in a storage medium, and includes several instructions for instructing one or more computer devices (which may be a personal computer, a server, a network device, or the like) to perform all or some of the steps of the methods described in the embodiments of the present invention.

It should be noted that the terms used herein are merely for describing specific implementations, and are not intended to limit exemplary implementations of the teachings herein. As used herein, the singular form is intended to include the plural form, unless the context clearly indicates otherwise. In addition, it should further be understood that terms "include" and/or "include" used in this specification indicate that there are features, steps, operations, devices, components, and/or combinations thereof.

The terms such as "first" and "second" in the specification, the claims, and the foregoing accompanying drawings of this application are intended to distinguish between similar objects, but are not necessarily used for describing a specific sequence or a chronological order. It should be understood that the data termed in such a way are interchangeable in appropriate circumstances, so that the embodiments of this application described herein can be implemented in orders other than the order illustrated or described herein.

The foregoing descriptions are merely example embodiments, but are not intended to limit the scope of the present disclosure. A person skilled in the art may make various modifications and variations. Any modification, equivalent replacement, or improvement made and the like within the spirit and principle shall fall within the protection scope of the present disclosure.

What is claimed is:

1. A method for programming operating devices, the method comprising:
    displaying, on a first interface, device controls for at least two operating devices associated with a target task to be executed, wherein the first interface is configured to configure programming logic of the device controls for the at least two operating devices;
    determining a respective device group to which each of the at least two operating devices belongs;
    configuring a group tag for each of the at least two operating devices, wherein the group tag is used for marking the device group to which the respective operating device belongs; and
    displaying, on a second interface associated with the first interface, a programming flowchart used when the at least two operating devices execute the target task;
    wherein the programming flowchart comprises at least two function blocks;
    each of the at least two function blocks is controlled by one of the at least two operating devices to perform one processing action;
    each of the at least two function blocks is marked with the respective group tag matching the respective operating device; and
    the second interface is configured to configure the at least two function blocks and execution logic between a first function block and a second function block;
    accepting a third editing operation performed on the first function block in the programming flowchart, wherein a first group tag is configured for the first function block;
    displaying a tag option list in response to the third editing operation, wherein the tag option list comprises a group tag of an operating device with a matching operation type as the first operating device controlling the first function block in different device groups used during execution of the target task;
    replacing the first group tag of the first function block with a second group tag;
    determining a second function block associated with the first function block in the target task, wherein the second function block and the first function block use the first operating device to perform the respective processing action, and the first group tag is configured for the second function block and the first function block;
    replacing the first group tag of the second function block with the second group tag; and
    executing the target task based on the first function block and the second function block and the execution logic between the first function block and the second function block using the device controls for the at least two operating devices.

2. The method according to claim 1, wherein configuring a group tag for each operating device comprises:
    accepting a first editing operation performed on the device control for each respective operating device; and
    acquiring, in response to the first editing operation, the group tag configured for the operating device.

3. The method according to claim 2, wherein:
    accepting a first editing operation performed on the device control for each respective operating device comprises:
    accepting a first trigger action performed on the device control for the respective operating device; and displaying a candidate group tag list on the first interface in response to the first trigger action, wherein each candidate group tag in the candidate group tag list comprises a tag identifier and tag description information; and
    acquiring the group tag configured for the operating device comprises: accepting a second trigger action in the candidate group tag list; and determining, in response to the second trigger action, the group tag configured for the respective operating device.

4. The method according to claim 2, wherein accepting a first editing operation performed on the device control for each respective operating device comprises:
    accepting a third trigger action performed on the device control for the respective operating device;
    displaying a tag configuration interface on the first interface in response to the third trigger action, wherein the tag configuration interface comprises device information of the operating device and a tag configuration control, the tag configuration control is configured to acquire a candidate group tag list, and each candidate group tag in the candidate group tag list comprises a tag identifier and tag description information; and acquiring the group tag configured for the operating device comprises: accepting a fourth trigger action in the candidate group tag list; and determining, in response to the fourth trigger action, the group tag configured for the operating device.

5. The method according to claim 4, wherein after acquiring the group tag configured for the respective operating device, the method further comprises:
accepting a second editing operation performed on the configured group tag; and
modifying a tag identifier of the group tag from an original identifier to a customized identifier in response to the second editing operation.

6. The method according to claim 1, wherein configuring a group tag for the respective operating device comprises:
acquiring task description information of the target task, wherein the task description information is used for describing device information of the respective operating device required for executing the target task; and
automatically configuring the group tag for the respective operating device according to the task description information.

7. The method according to claim 6, wherein automatically configuring the group tag for the respective operating device according to the task description information comprises sequentially configuring, according to a preset priority, candidate group tags in a candidate group tag list to the respective operating device used during execution of the target task.

8. The method according to claim 1, wherein accepting a third editing operation performed on a first function block in the programming flowchart comprises:
displaying, in response to detecting that an action trigger control is on an icon of the first group tag of the first function block, tag detail information matching the first group tag; and
acquiring a fifth trigger action performed on a selection control embedded in the tag detail information, wherein the fifth trigger action is used for triggering display of the tag option list.

9. The method according to claim 8, wherein after displaying a programming flowchart used when the at least two operating devices execute the target task, the method further comprises displaying, in response to detecting that the action trigger control is on an icon of a group tag of any function block, tag detail information matching the group tag.

10. A non-transitory computer-readable medium storing computer-executable instructions, the computer-executable instructions, when executed, causing a processor to:

display, on a first interface, device controls for at least two operating devices associated with a target task to be executed, wherein the first interface operates to configure programming logic of the device controls for the at least two operating devices;
determine a respective device group to which each of the at least two operating devices belongs;
configure a group tag for the at least two operating devices, wherein the group tag marks the device group to which the respective operating device belongs; and
display, on a second interface associated with the first interface, a programming flowchart used when the at least two operating devices execute the target task; and
controlling the at least two operating devices to execute the target task according to the programming flowchart;
wherein the programming flowchart comprises at least two function blocks;
each of the at least two function blocks is controlled by one of the at least two operating devices to perform one processing action;
each of the at least two function blocks is marked with the respective group tag matching the respective operating device; and
the second interface operates to configure the at least two function blocks and execution logic between the first function block and the second function block;
accepting a third editing operation performed on a first function block of the at least two function blocks in the programming flowchart, wherein a first group tag is configured for the first function block;
displaying a tag option list in response to the third editing operation, wherein the tag option list comprises a group tag of an operating device of the operation type as a first operating device controlling the first function block in different device groups used during execution of the target task;
replacing the first group tag of the first function block with a second group tag;
determining a second function block associated with the first function block in the target task, wherein the second function block and the first function block use the first operating device to perform the respective processing action, and the first group tag is configured for the second function block and the first function block; and
replacing the first group tag of the second function block with the second group tag; and
executing the target task based on the first function block and the second function block and the execution logic between the first function block and the second function block using the device controls for the at least two operating devices.

* * * * *